(12) United States Patent
Ganguly

(10) Patent No.: US 9,367,100 B2
(45) Date of Patent: Jun. 14, 2016

(54) ELECTRONIC DEVICES WITH SUBMERSION DETECTION CIRCUITRY

(71) Applicant: Apple Inc., Cupertino, CA (US)

(72) Inventor: Shameek P. Ganguly, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 14/324,573

(22) Filed: Jul. 7, 2014

(65) Prior Publication Data

US 2016/0004283 A1 Jan. 7, 2016

(51) Int. Cl.
*H01L 23/34* (2006.01)
*G06F 1/18* (2006.01)
*G01L 9/00* (2006.01)

(52) U.S. Cl.
CPC .............. *G06F 1/182* (2013.01); *G01L 9/0054* (2013.01)

(58) Field of Classification Search
CPC ............................. G06F 1/182; G01L 9/0054
USPC ........................................... 257/722; 307/118
See application file for complete search history.

(56) References Cited

U.S. PATENT DOCUMENTS

| | | | |
|---|---|---|---|
| 4,479,070 A * | 10/1984 | Frische | G01L 9/0022 310/338 |
| 4,783,772 A | 11/1988 | Umemoto et al. | |
| 6,543,292 B1 * | 4/2003 | Colton | G01L 19/143 73/723 |
| 8,489,141 B2 | 7/2013 | Tanaka et al. | |
| 8,744,418 B2 | 6/2014 | Novet | |
| 2011/0105100 A1 * | 5/2011 | Tanaka | H01H 13/702 455/418 |
| 2011/0228075 A1 * | 9/2011 | Madden | G03B 15/05 348/81 |
| 2012/0020015 A1 * | 1/2012 | Tian | G06F 1/206 361/679.48 |
| 2012/0188362 A1 | 7/2012 | Takimoto et al. | |
| 2012/0243854 A1 * | 9/2012 | Takimoto | G01M 3/3272 396/26 |
| 2014/0055346 A1 | 2/2014 | Boni et al. | |

\* cited by examiner

*Primary Examiner* — Thien F Tran
(74) *Attorney, Agent, or Firm* — Treyz Law Group, P.C.; Kendall P. Woodruff

(57) ABSTRACT

A portable electronic device may include submersion detection circuitry for detecting when the electronic device is submerged in water or other liquids. The submersion detection circuitry may include a barometric pressure sensor that gathers air pressure information. Control circuitry in the electronic device may monitor the air pressure sensor for sharp changes in air pressure indicating that the electronic device has been dropped or submerged in water. Various actions may be taken in response to determining that the electronic device is in water. If the electronic device is not intended to operate underwater, a power management unit may automatically power down electrical components in the electronic device in response to determining that the electronic device is in water. If the electronic device is intended to operate underwater, control circuitry may determine and track a water depth level at which the electronic device is submerged based on the air pressure information.

20 Claims, 6 Drawing Sheets

ELECTRONIC DEVICES WITH SUBMERSION DETECTION CIRCUITRY

BACKGROUND

This relates generally to electronic devices and, more particularly, to protecting electrical components in electronic devices from water and other liquids.

Electronic devices may contain complex electronic circuitry. Electronic components such as memory, processors, and other circuits can be highly sensitive to moisture. Too much moisture can create unintended low resistance connections between nodes that are meant to be at different voltages making the circuits perform unpredictably or malfunction. If an electronic device is dropped into water, water seepage into the interior of the electronic device may cause irreversible damage to the electronic device.

Electronic devices often include hydrophobic coatings and rubber gaskets to protect internal electronics in the event of that the electronic device is splashed with water. However, such moisture barriers may be insufficient if the electronic device becomes completely submerged in water.

Some portable electronic devices are designed to maintain some functionality even when underwater. However, such electronic devices are typically only functional within a certain depth of water and are prone to failure if submerged below that depth.

It would therefore be desirable to be able to provide electronic device with improved water protection systems.

SUMMARY

A portable electronic device may include submersion detection circuitry for detecting when the electronic device is submerged in water or other liquids. The submersion detection circuitry may include a barometric pressure sensor that gathers air pressure information. The pressure sensor may be a diaphragm-based piezo-resistive pressure sensor or may be any other suitable type of pressure sensor.

Control circuitry in the electronic device may monitor the air pressure sensor for sharp changes in air pressure indicating that the electronic device has been dropped or submerged in water. For example, the control circuitry may determine that the electronic device is in water if the rate of change of air pressure detected by the air pressure sensor exceeds a threshold rate.

Various actions may be taken in response to determining that the electronic device is in water. In configurations where the electronic device is not intended to operate underwater, a power management unit may automatically power down electrical components in the electronic device such as a display module in response to determining that the electronic device is in water.

If desired, the control circuitry may initiate a data backup operation in response to determining that the electronic device is in water. The data backup operation may include wirelessly transferring a copy of data stored on the electronic device to an online storage location.

Air pressure information may also be used to determine when the electronic device is removed from water. In response to determining that the electronic device has been removed from water, the control circuitry may initiate a drying process which may include heating up one or more electrical components in the electronic device.

The electronic device may include one or more humidity sensors that gather humidity information. The control circuitry may determine whether the electronic device is sufficiently dry based on the humidity information. When it is determined that the electronic device is sufficiently dry, a power management unit may power up electrical components in the electronic device to return the electronic device to a normal mode of operation.

In configurations where the electronic device is intended to operate underwater, control circuitry may determine and track a water depth level at which the electronic device is submerged using the air pressure information gathered by the air pressure sensor. The control circuitry may include a power management unit that automatically powers down electrical components in the electronic device when it is determined that the water depth level exceeds a threshold depth level or that a change in water depth level exceeds a threshold.

Further features of the invention, its nature and various advantages will be more apparent from the accompanying drawings and the following detailed description of the preferred embodiments.

DETAILED DESCRIPTION

Figure 1:
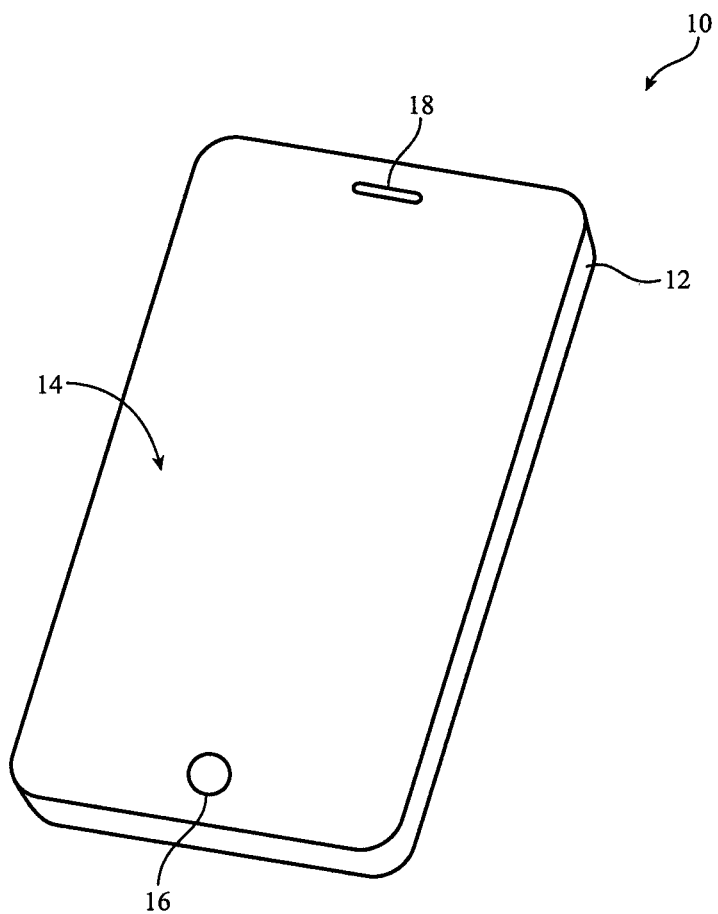
FIG. 1 is a perspective view of an illustrative electronic device of the type that may be provided with submersion detection circuitry in accordance with an embodiment of the present invention.

An illustrative electronic device that may be provided with submersion circuitry is shown in FIG. 1. Electronic device 10 of FIG. 1 may be a handheld electronic device or other electronic device. For example, electronic device 10 may be a cellular telephone, media player, or other handheld portable device, a somewhat smaller portable device such as a wristwatch device, pendant device, or other wearable or miniature device, gaming equipment, a tablet computer, a notebook computer, a desktop computer, a television, a computer monitor, a computer integrated into a computer display, or other electronic equipment.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14, display 14 may contain an array of active display pixels. This region is sometimes referred to as the active area of the display. A rectangular ring-shaped region surrounding the periphery of the active display region may not contain any active display pixels and may therefore sometimes be referred to as the inactive area of the display. The display cover layer or other display layers in display 14 may be provided with an opaque masking layer in the inactive region to hide internal components from view by a user.

Figure 2:
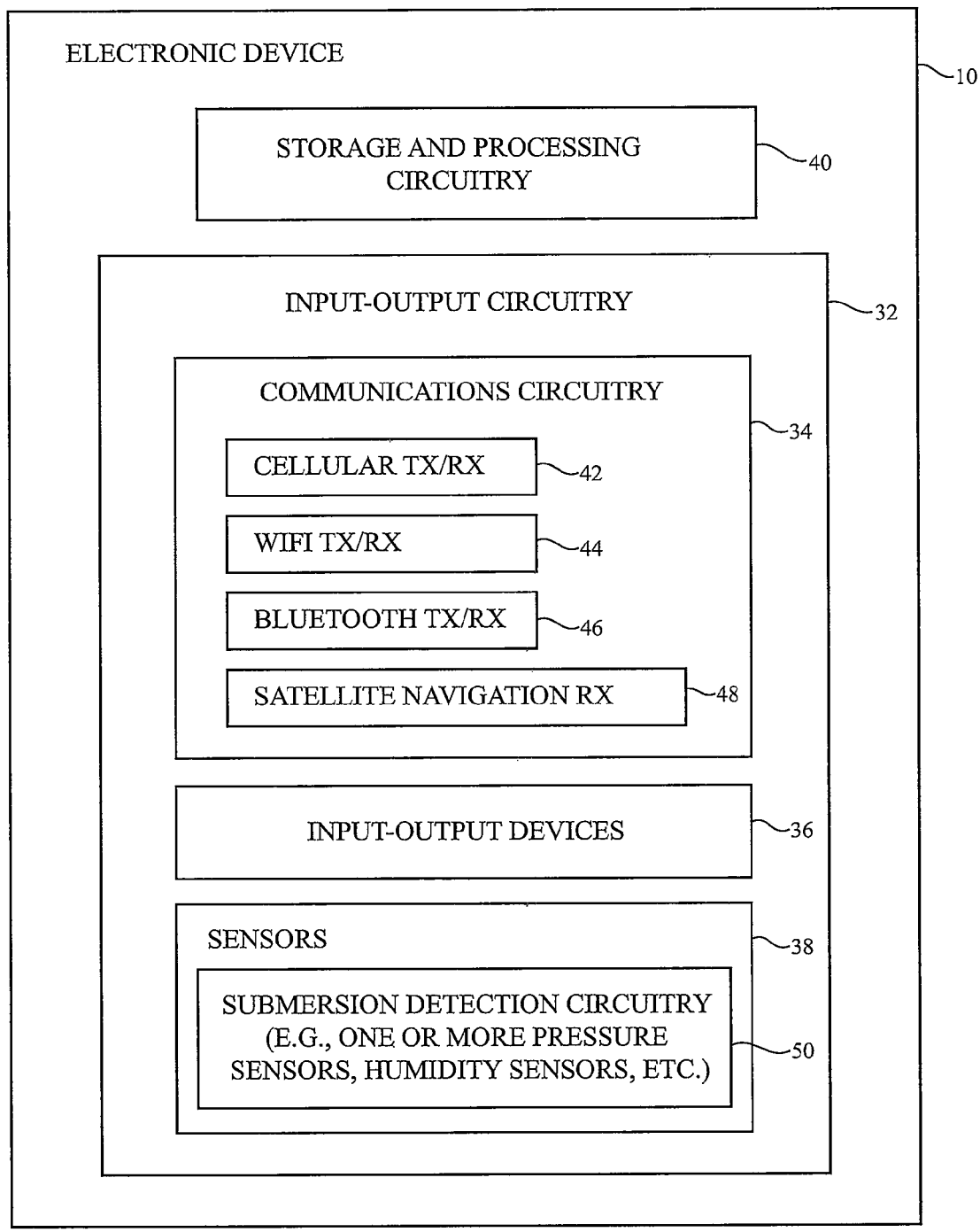
FIG. 2 is a schematic diagram of an illustrative electronic device having submersion detection circuitry in accordance with an embodiment of the present invention.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on one or more microprocessors, microcontrollers, digital signal processors, baseband processor integrated circuits, application specific integrated circuits, etc.

With one suitable arrangement, storage and processing circuitry 40 may be used to run software on device 10 such as internet browsing applications, email applications, media playback applications, activity logging applications, fitness applications, operating system functions, software for capturing and processing images, software implementing functions associated with gathering and processing sensor data, software that makes adjustments to display brightness and touch sensor functionality, etc.

To support interactions with external equipment, storage and processing circuitry 40 may be used in implementing communications protocols. Communications protocols that may be implemented using storage and processing circuitry 40 include internet protocols, wireless local area network protocols (e.g., IEEE 802.11 protocols—sometimes referred to as WiFi®), protocols for other short-range wireless communications links such as the Bluetooth® protocol, etc.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). As shown in FIG. 2, circuitry 34 may include one or more radio-frequency transceivers such as cellular telephone transceiver circuitry 42 (e.g., one or more cellular telephone transmitters and/or receivers), IEEE 802.11 (WiFi®) transceiver circuitry 44 (e.g., one or more wireless local area network transmitters and/or receivers), Bluetooth® transceiver circuitry 46 such as a Bluetooth® Low Energy (Bluetooth LE) transmitter and/or receiver, and satellite navigation system receiver circuitry (e.g., a Global Positioning System receiver or other satellite navigation system receiver).

Input-output circuitry 32 may include input-output devices 36 such as buttons, joysticks, click wheels, scrolling wheels, touch screens, other components with touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, keyboards and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures. Sensors 38 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology). If desired, other components in device 10 may be formed using microelectromechanical systems technology.

To determine when electronic device 10 becomes submerged in water and to determine the depth at which electronic device 10 is submerged in water, sensors 38 may be provided with submersion detection circuitry 50 (sometimes referred to as moisture detection circuitry). Submersion detection circuitry 50 may include one or more sensors for detecting when electronic device 10 becomes submerged in water or other liquids. Sensors that may be used in submersion detection circuitry 50 include one or more air pressure sensors, humidity sensors, accelerometers, (e.g., accelerometers that measure acceleration along one, two, or three axes), force sensors, switches or other mechanical sensors, capacitive sensors, resistance-based sensors, light-based sensors, acoustic-based sensors such as ultrasonic acoustic-based sensors, other suitable types of sensors, a combination of any two or more of these types of sensors, etc. Submersion detection circuitry 50 may use storage and processing circuitry (e.g., storage and processing circuitry 40, sometimes referred to as control circuitry 40) to store and process sensor data gathered using submersion detection circuitry 50.

Sensor signals from submersion detection circuitry 50 may be conveyed to control circuitry 40 in electronic device 10. Control circuitry 40 may process the sensor signals and take suitable action based on whether or not electronic device 10 is submerged and, in some cases, based on the depth at which electronic device 10 is submerged.

Control circuitry 40 may, for example, monitor an air pressure sensor in submersion detection circuitry 50 for changes in air pressure. Air pressure may change within electronic device 10 in response to changes in the environment around electronic device 10. For example, when electronic device 10 is held in the air, air pressure within the device may increase by about 12 pascals (Pa) with every one meter decrease in height. In contrast, when electronic device 10 is held in water, air pressure may increase by about 10,000 pascals (10 kPa) with every one meter decrease in height (as examples).

Thus, when the pressure sensor in submersion detection circuitry 50 detects a sharp increase in air pressure, control circuitry 40 may determine that electronic device 10 is submerged in water and may take appropriate action. For example, control circuitry 40 may immediately and automatically power down electrical components in electronic device 10 to prevent short circuits as a result of water ingress. Automatically powering down electrical components in response to detecting that the electronic device has been submerged in water may help prevent irrevocable damage that may occur if the electronic device is not powered down until a user removes the electronic device from the water, as the user reaction time may exceed the time required for a short circuit to occur.

In configurations where electronic device 10 is intended to maintain functionality under water (e.g., when electronic device 10 is water-tight or waterproof), control circuitry 40 may use the pressure sensor in submersion detection circuitry 50 to track or monitor the depth at which electronic device 10 is submerged.

Figure 3:
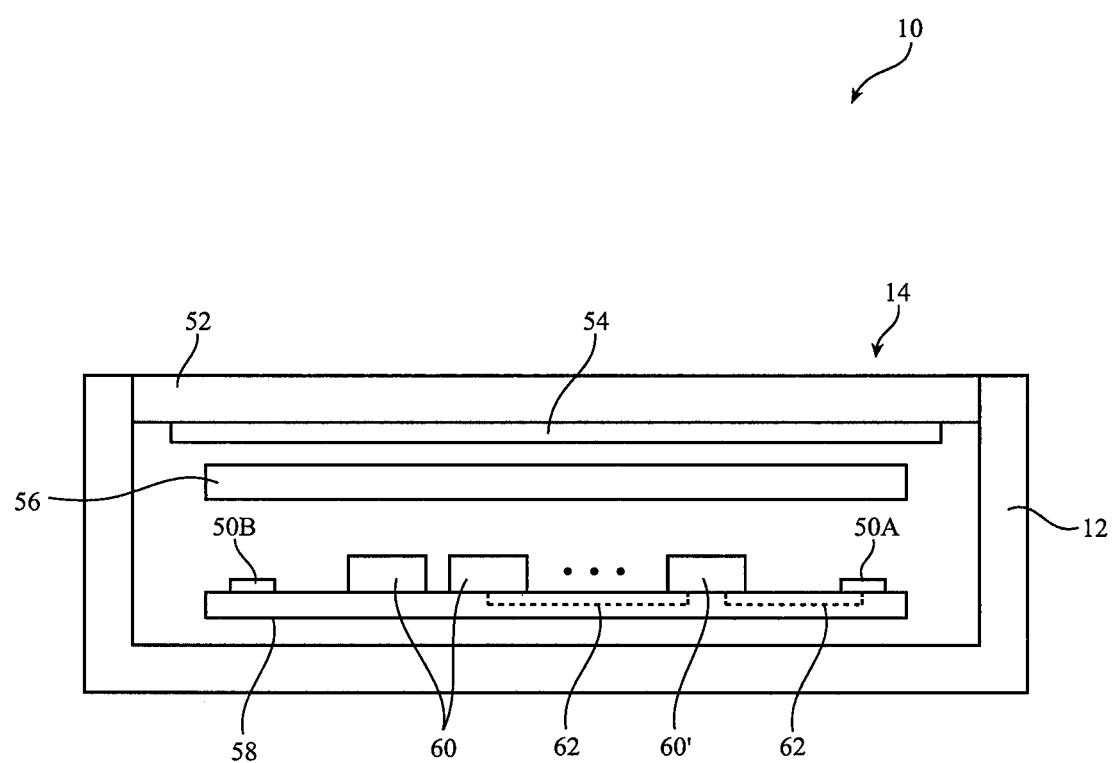
FIG. 3 is a cross-sectional side view of an electronic device having electrical components and submersion detection circuitry in accordance with an embodiment of the present invention.

A cross-sectional side view of an illustrative electronic device of the type that may be provided with submersion detection circuitry is shown in FIG. 3. As shown in FIG. 3, display 14 may be formed from a display module such as display module 54 mounted under a cover layer such as display cover layer 52 (as an example). Display 14 (e.g., display module 54) may be a liquid crystal display, an organic light-emitting diode display, a plasma display, an electrophoretic display, a display that is insensitive to touch, a touch-sensitive display that incorporates an array of capacitive touch sensor electrodes or other touch sensor structures, or may be any other type of suitable display. Display cover layer 52 may be a layer of clear glass, a transparent plastic member, or other clear structure.

Electrical components 60 may be mounted within the interior of housing 12. As shown in FIG. 3, for example, components 60 may be mounted to printed circuit boards such as printed circuit board 58. Integrated circuits, power management units, storage such as volatile and non-volatile memory, discrete components such as resistors, capacitors, and inductors, and other electronic components 60 may be mounted to printed circuit 58. Printed circuit boards in electronic device 10 such as circuit board 58 may include rigid printed circuit boards (e.g., printed circuit boards formed from fiberglass-filled epoxy or other rigid printed circuit board material) and flexible printed circuits (e.g., flex circuits formed from sheets of polyimide or other flexible polymer layers). Patterned metal traces 62 within printed circuit board 58 may be used to form signal paths between components 60. Electronic device 10 may include other electrical components such as battery 56, display module 42, buttons, sensors, connectors, etc.

Electronic device 10 may be provided with submersion detection circuitry having one or more sensors such as sensor 50A and sensor 50B. Sensors such as sensor 50A may be air pressure sensors that measure the air pressure within electronic device 10. Air pressure sensors in electronic device 10 such as air pressure sensor 50A may, for example, include absolute barometric diaphragm-based pressure sensors formed from piezo-resistors embedded in a micro-machined silicon diaphragm (sometimes referred to as a piezo-resistive pressure sensor). This is, however, merely illustrative. If desired, other suitable pressure sensor technology may be used (e.g., strain gauge based pressure sensors having a metal strain gauge on a metal diaphragm, capacitive based pressure sensors having a parallel plate capacitor structure on a diaphragm, other suitable microelectromechanical systems based pressure sensors, etc.). Sensors such as sensor 50B may be humidity sensors that measure the humidity within electronic device 10.

Air pressure sensor 50A may be used in detecting when electronic device 10 is submerged in water or other liquids. For example, control circuitry 40 may monitor pressure sensor 50A for changes in air pressure. When pressure sensor 50A detects a sharp increase in air pressure (e.g., when the air pressure increases at a rate that exceeds a threshold), control circuitry 40 may determine that electronic device 10 is in water and may take appropriate action.

For example, control circuitry 40 may include a power management unit such as power management unit 60'. Air pressure information gathered by air pressure sensor 50A may be provided to power management unit 60' over path 62'. Power management unit 60' may monitor air pressure information gathered by air pressure sensor 50A and may control the supply of power from battery 56 to electrical components (e.g., display module 54, electrical components 60, other electrical components in electronic device 10, etc.) based on the air pressure information gathered by air pressure sensor 50A.

If the air pressure information indicates that electronic device 10 is in water (sometimes referred to as a submersion event, although electronic device 10 need not be completely submerged for power management unit 60' to detect that electronic device 10 is in water), power management unit 60' may, if desired, cut off the supply of power from battery 56 to one or more electrical components in electronic device 10.

If a user attempts to power up electronic device 10 after a submersion event (e.g., when the interior of electronic device 10 is not yet dry), control circuitry 40 may, if desired, present a message (e.g., a visual message using a status indicator or display module 54 or an audio message or alert using a speaker in electronic device 10) to the user to alert the user of the submersion event.

This is, however, merely illustrative. In general, any number of suitable actions may be taken in response to determining that electronic device 10 is submerged in water. For example, control circuitry 40 may automatically initiate a data backup operation whereby data stored in electronic device 10 is wirelessly copied to a backup storage location (e.g., an online storage system). The data backup operation may be initiated prior to powering down electrical components or may be initiated while some electrical components are powered down. If desired, electrical components may be shut down in a predetermined order (e.g., where the most moisture-sensitive or the most critical components are shut down first while other components remain on).

In configurations where electronic device 10 is designed for underwater operation, control circuitry 40 may determine the depth at which electronic device 10 is submerged based on air pressure sensor data. For example, based on the sensed air pressure in electronic device 10 and based on a predetermined fluid density such as the density of water, control circuitry 40 may determine the height of the fluid column directly above electronic device 10, which in turn corresponds to the depth at which electronic device 10 is submerged. If desired, control circuitry 40 may monitor the water depth level at which electronic device 10 is submerged using pressure sensor 50A to detect when electronic device 10 sinks below a threshold depth beyond which electronic device 10 is susceptible to water damage. For example, electronic device 10 may be water-tight in water up to three meters deep (as an example). If control circuitry 40 determines that electronic device 10 is submerged at a depth below the depth threshold (or if control circuitry 40 determines that a change in depth exceeds a threshold), control circuitry 40 may, for example, begin to power down electrical components within electronic device 10 (e.g., components 60, display module 54, etc.).

If desired, electronic device 10 may include multiple pressure sensors 50A for covering various ranges of atmospheric pressure. For example, a first pressure sensor 50A may be sensitive to a first range of atmospheric pressures and may be used in determining the altitude of electronic device 10 in air. A second pressure sensor 50A may be sensitive to a second range of atmospheric pressures and may be used to determining the depth of electronic device 10 in water. Control circuitry 40 may take various actions based on information gathered by both pressure sensors 50A.

If desired, pressure sensor data may be combined with motion sensor data to determine what type of activity is being performed by a user. For example, control circuitry 40 may use pressure sensor signals from pressure sensor 50A to determine that electronic device 10 is underwater and motion sensor signals from an accelerometer in electronic device 10 to determine that a user holding electronic device 10 is swimming. This type of activity information may be used by a fitness application that runs on electronic device 10 (as an example).

Pressure sensor 50A may also be used in detecting when electronic device 10 is removed from water. For example, when pressure sensor 50A detects a sharp decrease in air pressure (e.g., when the air pressure decreases at a rate that exceeds a threshold), control circuitry 40 may determine that electronic device 10 has been removed from water and may take appropriate action. For example, control circuitry 40 may initiate a drying process whereby portions of electronic device 10 are heated until moisture levels in electronic device 10 are sufficiently low. This may include, for example, heating up certain components (e.g., components 60, other electrical components in device 10, etc.) until the interior of the electronic device is dry. For example, components 60 may include a regulated heating element specifically designed to generate a desired amount of heat based on received control signals (e.g., control signals provided by control circuitry 40). As another example, components 60 may include a processor that generates heat when performing computationally intense tasks. The processor may be intentionally heated in this way during the drying cycle to help omit moisture from the interior of electronic device 10 after a submersion event.

If desired, humidity sensors such as sensor 50B may be used during the drying cycle to detect when the interior of electronic device 10 is sufficiently dry. Control circuitry such as power management unit 60' may monitor interior humidity levels using humidity sensor 50B to determine when it is safe for electronic device 10 to be fully powered and actively operated by a user. If desired, there may be multiple humidity sensors 50B in electronic device 10 to measure the interior humidity near specific components. This in turn may be used to control which components are heated during the drying cycle and/or which components can be safely turned on during the drying process.

Figure 4:
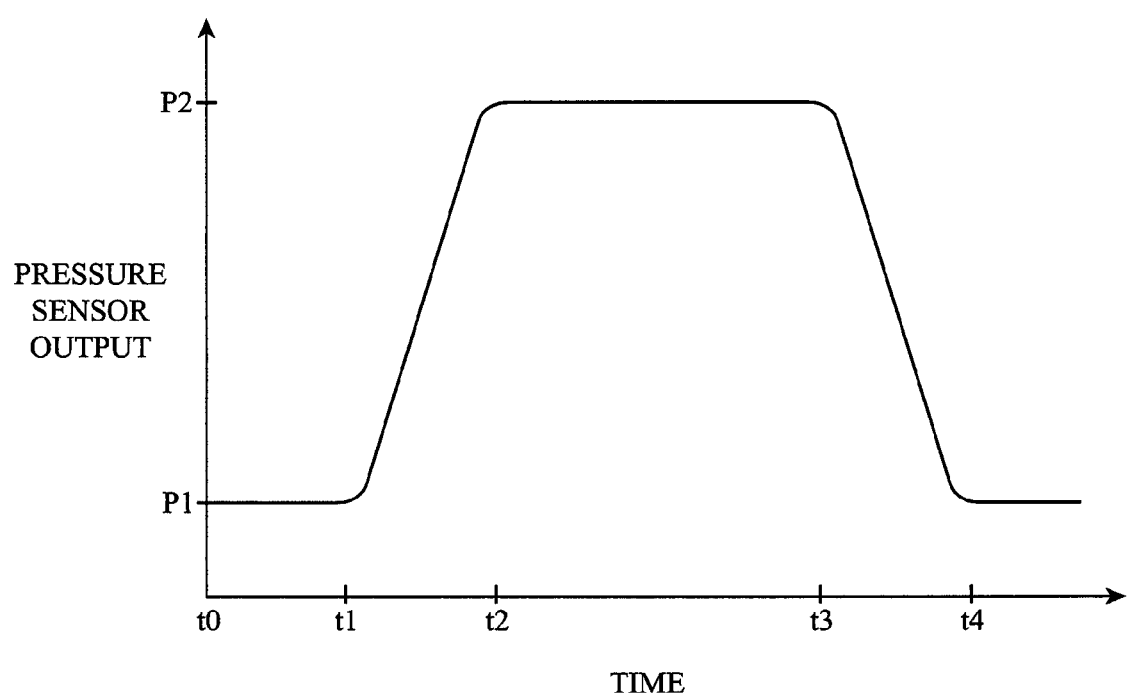
FIG. 4 is graph showing illustrative signal output from a pressure sensor in an electronic device in the event that the electronic device is submerged in water for a period of time in accordance with an embodiment of the present invention.

FIG. 4 is a graph illustrating how air pressure sensor signals from a pressure sensor such as air pressure sensor 50A in electronic device 10 may change in the event that electronic device 10 is dropped in water.

From time t0 to time t1, electronic device 10 is being held in the air and the internal air pressure measured by pressure sensor 50A is P1. At time t1, electronic device 10 is dropped in water and the air pressure measured by pressure sensor 50A begins to rapidly increase. In this example, the measured air pressure increases from P1 at time t1 to P2 at time t2, where electronic device 10 is no longer sinking and remains at a given depth level. For example, electronic device 10 may reach the bottom of a sink or pool at time t2. The rate R of change in pressure from time t1 to time t2 is then $R=(P2-P1)/(t2-t1)$.

Upon determining that the rate of change in air pressure from time t1 to time t2 is greater than a predetermined threshold rate, control circuitry 40 may take appropriate action. This may include, for example, powering down electronic components in electronic device 10 and/or initiating a data backup operation. In configurations where electronic device 10 is intended to operate in an underwater mode, control circuitry 40 may begin to operate electronic device 10 in the underwater mode in response to determining that the rate R is greater than the predetermined threshold.

At time t3, a user lifts electronic device 10 from the water and at time t4, electronic device 10 is moved from water to air. If desired, control circuitry 40 may monitor the air pressure measured by pressure sensor 50A to determine when electronic device 10 is removed from water based on the rate of change in pressure from time t3 to time t4. Control circuitry 40 may take appropriate action in response to determining that electronic device 10 has been removed from the water. For example, control circuitry 40 may initiate a drying cycle to dry the interior of electronic device 10 until electronic components can safely be powered up.

Figure 5:
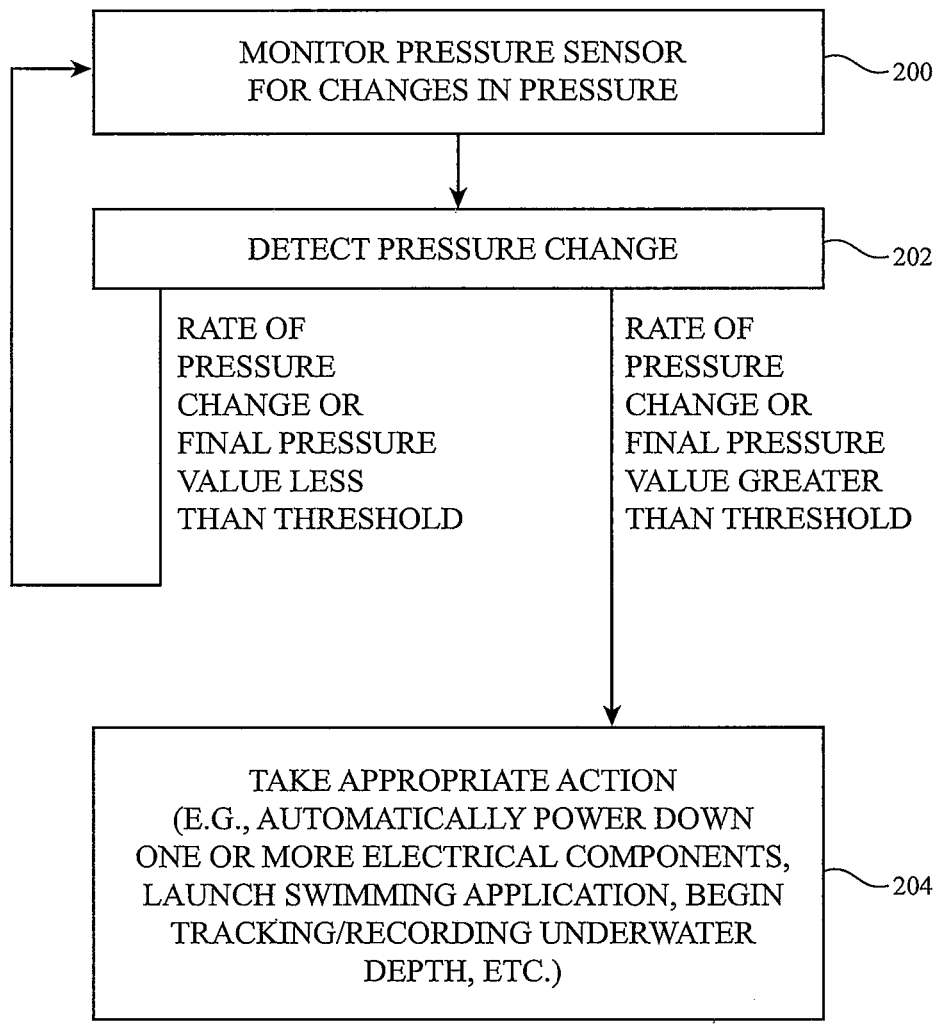
FIG. 5 is a flowchart of illustrative steps involved in operating an electronic device having submersion detection circuitry in accordance with an embodiment of the present invention.

FIG. 5 is a flowchart of illustrative steps involved in operating an electronic device having submersion detection circuitry such as electronic device 10 of FIGS. 1, 2, and 3.

At step 200, control circuitry 40 may monitor air pressure sensor 50A for changes in air pressure.

At step 202, air pressure sensor 50A may detect a change in air pressure and control circuitry 40 may determine whether electronic device 10 has been submerged in water based on the change in air pressure. This may include, for example, comparing the rate of change in air pressure with a predetermined threshold rate. If desired, control circuitry 40 may also use a final air pressure value (e.g., an air pressure value measured by air pressure sensor 50A at a given time such as time t2 of FIG. 4) to determine whether electronic device 10 has been submerged in water.

If control circuitry 40 determines that the rate of change in air pressure is less than the predetermined threshold, processing may loop back to step 200 where control circuitry 40 continues to monitor pressure sensor 50A for changes in air pressure. If control circuitry 40 determines that the rate of change in air pressure exceeds the predetermined threshold, processing may proceed to step 204.

At step 204, control circuitry 40 may take appropriate action. For example, in configurations where electronic device 10 not is intended to operate underwater, control circuitry 40 may initiate a power-down process in which electrical components are powered off (e.g., in which power management unit 60' cuts off a power supply from battery 56 to components 60, display module 54, other electrical components, etc.). Electrical components may be powered off at the same time or may be powered off in a predetermined order. If desired, control circuitry 40 may initiate a data backup process before or while electrical components are being powered down.

In configurations where electronic device 10 is intended to operate underwater, control circuitry 40 may switch electronic device 10 into underwater mode in response to determining that the device has been submerged. This may include, for example, automatically launching a swimming application that runs on electronic device 10 and/or tracking the depth at which electronic device 10 is submerged based on sensor signals from pressure sensor 50A. The water depth information may be recorded in the swimming application or may be used for other purposes.

Water depth information may also be used to determine when electronic device 10 exceeds the water depth threshold at which electronic device 10 is intended to operate. This may include, for example, determining that an actual water depth level exceeds a threshold or that a change in water depth level exceeds a threshold. Similar to the power-down process that is initiated in non-waterproof device configurations, control circuitry 40 may take appropriate action in response to determining that electronic device 10 is deeper than the water depth threshold.

Figure 6:
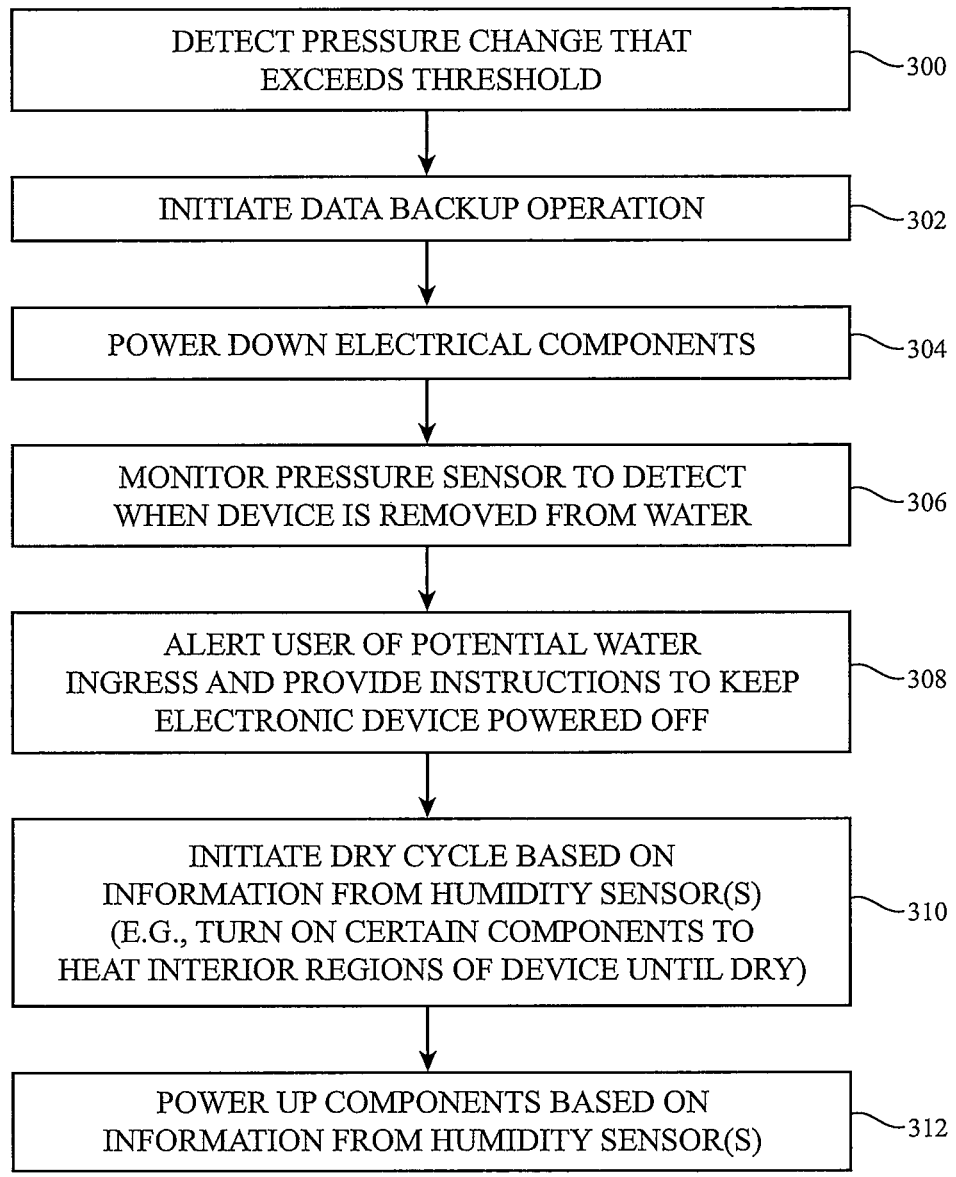
FIG. 6 is a flowchart of illustrative steps involved in operating an electronic device when the electronic device is dropped or submerged in water in accordance with an embodiment of the present invention.

FIG. 6 is a flow chart of illustrative steps involved in operating an electronic device in the event that the electronic device becomes submerged in water or sinks below a water depth threshold.

At step 300, pressure sensor 50A may detect a change in air pressure and control circuitry 40 may determine, based on the change in air pressure, that electronic device 10 has been submerged in water or has sunk below a water depth level threshold.

At optional step 302, control circuitry 40 may initiate a data backup operation in which some or all of the data stored in electronic device is copied to a backup storage location (e.g., wirelessly transferred to an online storage system). If desired, the data backup operation may be performed based on user preferences. For example, a user may adjust a setting on electronic device 10 that dictates whether or not a data backup operation is performed in a water submersion event.

At step 304, control circuitry 40 may power down critical electrical components in electronic device 10 (e.g., power management unit 60' may cut off a power supply from battery 56 to components 60, display module 54, other electrical components, etc.). Electrical components may be powered off at the same time or may be powered off in a predetermined order (e.g., a display may be powered down before a baseband processor in electronic device 10, if desired). If desired, control circuitry 40 may initiate the data backup process of step 302 before or while electrical components are being powered down in step 304.

At step 306, control circuitry 40 may monitor pressure sensor 40A for changes in air pressure to detect when electronic device 10 is removed from water. This may include, for example, detecting a rapid decrease in air pressure using air pressure sensor 50A. In response to detecting that electronic device 10 is no longer submerged, processing may proceed to optional step 308.

At optional step 308, electronic device 10 may present an alert indicating that moisture may have infiltrated the electronic device and that the electronic device should remain powered off until it is determined that the device can be safely operated (e.g., until the device is sufficiently dry to allow electrical components to be powered up and actively operated). The alert may be a visual alert (e.g., presented using display pixels, status indicators such as light-emitting diode status indicators, or other visual media) or may be an audio alert presented using one or more speakers in electronic device 10.

At optional step 310, control circuitry 40 may initiate a drying cycle in which portions of electronic device 10 are heated until dry. This may include, for example, providing power to one or more electrical components to heat the electrical components and thereby dry the surrounding area. For example, a regulated heating element may be heated and/or a processor may perform computationally intense tasks to intentionally generate heat. If desired, sensors such as humidity sensor 50B may be used to control the drying cycle. For example, humidity sensor 50B may be monitored to determine when electronic device 10 is sufficiently dry and ready to be fully powered on. If desired, multiple humidity sensors 50B may be used during the drying cycle to determine which components need to be heated.

At step 312, control circuitry 40 may determine that electronic device 10 is sufficiently dry based on information from humidity sensor 50B. Control circuitry 40 may then power up electrical components in electronic device 10 to return electronic device 10 to a normal mode of operation.

The foregoing is merely illustrative of the principles of this invention and various modifications can be made by those skilled in the art without departing from the scope and spirit of the invention.

What is claimed is:

1. A portable electronic device having a housing, comprising:
   at least one electrical component mounted in the housing;
   an air pressure sensor in the housing that gathers air pressure information; and
   control circuitry that determines whether the portable electronic device is in water based on the air pressure information and that automatically powers down the at least one electrical component in response to determining that the portable electronic device is in water.

2. The portable electronic device defined in claim 1 wherein the at least one electrical component is a display module.

3. The portable electronic device defined in claim 1 wherein the control circuitry comprises a power management unit.

4. The portable electronic device defined in claim 3 wherein the air pressure sensor comprises a piezo-resistive pressure sensor.

5. The portable electronic device defined in claim 4 wherein the air pressure sensor and the power management unit are mounted to a printed circuit board in the electronic device and wherein the printed circuit board comprises at least one metal trace that conveys the air pressure information from the air pressure sensor to the power management unit.

6. The portable electronic device defined in claim 3 further comprising a humidity sensor in the housing that gathers humidity information.

7. The portable electronic device defined in claim 6 wherein the power management unit determines when to power up the at least one electrical component based on the humidity information.

8. A portable electronic device having a housing, comprising:
   at least one electrical component mounted in the housing;
   an air pressure sensor in the housing that gathers air pressure information; and
   control circuitry that determines a depth parameter value based on the air pressure information and that powers down the at least one electrical component in response to determining that the depth parameter value is greater than a threshold, wherein the depth parameter value is selected from the group consisting of: a depth at which the portable electronic device is submerged in water and a change in depth at which the portable electronic device is submerged in water.

9. The portable electronic device defined in claim 8 wherein the at least one electrical component is a display module.

10. The portable electronic device defined in claim 8 wherein the control circuitry comprises a power management unit.

11. The portable electronic device defined in claim 10 wherein the air pressure sensor comprises a diaphragm-based pressure sensor.

12. The portable electronic device defined in claim 10 wherein the air pressure sensor and the power management unit are mounted to a printed circuit board in the electronic device and wherein the printed circuit board comprises at least one metal trace that conveys the air pressure information from the air pressure sensor to the power management unit.

13. A method for operating a portable electronic device, comprising:
   with control circuitry in the portable electronic device, gathering air pressure information from an air pressure sensor in the portable electronic device;
   determining whether the portable electronic device is in water based on the air pressure information; and
   in response to determining that the portable electronic device is in water, automatically powering down at least one electrical component in the portable electronic device.

14. The method defined in claim 13 further comprising:
   in response to determining that the portable electronic device is in water, initiating a data backup operation.

15. The method defined in claim 13 wherein determining whether the portable electronic device is in water based on the air pressure information comprises comparing a rate of change in air pressure with a threshold rate.

16. The method defined in claim 13 further comprising:
   with the control circuitry, gathering additional air pressure information from the air pressure sensor in the portable electronic device; and
   determining whether the portable electronic device is removed from the water based on the additional air pressure information.

17. The method defined in claim 16 further comprising:
   in response to determining that the portable electronic device is removed from the water, initiating a drying process in the portable electronic device, wherein initiating the drying process comprises heating up at least one additional electrical component in the portable electronic device.

18. The method defined in claim 17 further comprising:
   with the control circuitry, gathering humidity information from a humidity sensor in the portable electronic device.

19. The method defined in claim 18 further comprising:
   determining that the drying process is complete based on the humidity information; and
   in response to determining that the drying process is complete, powering up the at least one electrical component.

20. The method defined in claim 13 wherein the control circuitry comprises a power management unit.

* * * * *